United States Patent [19]

Weinstein

[11] 4,297,893

[45] Nov. 3, 1981

[54] METHOD AND APPARATUS FOR MEASURING FLOW CHARACTERISTICS OF MOVING FLUID STREAM

[75] Inventor: Larry J. Weinstein, Littleton, Colo.

[73] Assignee: Johns-Manville Corporation, Denver, Colo.

[21] Appl. No.: 125,303

[22] Filed: Feb. 27, 1980

[51] Int. Cl.³ .................................................. G01F 13/00
[52] U.S. Cl. ........................................ 73/861; 358/107
[58] Field of Search .......................... 73/861, 344, 355; 250/560; 358/100, 107

[56] References Cited

U.S. PATENT DOCUMENTS

| | | | |
|---|---|---|---|
| 3,243,509 | 3/1966 | Stut | 358/107 |
| 4,090,241 | 5/1978 | Houston | 73/861 |
| 4,160,599 | 7/1979 | Sperraza | 250/560 |

*Primary Examiner*—Herbert Goldstein

*Attorney, Agent, or Firm*—Robert M. Krone; Joseph J. Kelly

[57] ABSTRACT

This invention relates to the measurement of the temperature and/or mass flow rate of a free falling molten stream of material. Previous techniques have not recognized the effects temperature variations of the molten stream of material have on the measurement of the above flow properties. The present invention utilizes a line scan camera having photodiodes disposed in a predetermined array to measure the temperature and mass flow rate of a moving mass of molten material. This is accomplished in the present invention by limiting the maximum voltage generated by any one photodiode exposed to light energy of a mass by varying the scan rate and thus the exposure time of the photodiodes in response to a variance in the light intensity and thus the temperature of the molten mass of material.

20 Claims, 9 Drawing Figures

METHOD AND APPARATUS FOR MEASURING FLOW CHARACTERISTICS OF MOVING FLUID STREAM

TECHNICAL FIELD

This invention relates to the accurate estimation of certain flow parameters of a moving fluid stream. In particular, the present invention relates to a method and apparatus for determining the temperature and mass flow rate of a free falling molten stream of fluid. Still more particularly the instant invention relates to the non-invasive measurement of the temperature and pour rate of molten material falling by means of gravity from a melting furnace.

BACKGROUND OF THE PRIOR ART

In conventional manufacturing processes for the production of a final product from a molten material such as a metal, refractory or a glass, a melter such as a gas or electric furnace or a bushing is utilized. In order to maintain a proper product quality it is important to measure the temperature and/or mass flow rate or pour rate of the molten material emanating from the furnace.

Heretofore, the monitoring of these flow properties of a freely falling stream of molten material has been plagued with problems. For example, when measuring temperature, placing a contact temperature sensing device such as a thermocouple into the stream alters the flow of the material and may be rapidly eroded by a moving corrosive mass. When the moving mass is a solid object placing a device such as a thermocouple in contact with the moving mass results in rapid abrasive wear. Present non-invasive temperature sensing means such as optical pyrometers fail to provide any measurement of mass flow rates.

A so-called "catch bucket" or "ladle" method has been utilized to estimate mass flow rates. By this method a stream of molten material flowing from an over-head furnace is temporarily interrupted by inserting a ladle or a catch bucket of a known weight into the stream for a predetermined time period. The mass of the material that is accumulated during this period is then weighed and the mass per unit time calculated. This information may be utilized to effect a manual adjustment of the temperature of the furnace so that a desired mass flow rate may be obtained.

Although the "ladle" method of determining the pour rate of a furnace may have been appropriate for the manufacturing processes of the past, it suffers from a number of drawbacks. First, this method necessitates that the molten stream be intercepted thereby interrupting the flow rate of the stream and the continuity of any subsequent manufacturing steps. Secondly, the "ladle" method does not provide a continuous flow of data indicative of the mass flow rate of the furnace. Consequently, the "ladle" method provides representative data that is insufficient for a closed loop automated control of the furnace.

One prior are technique which provides a non-invasive method and apparatus for estimating the mass flow rate of a freely falling fluid stream from furnaces is disclosed in U.S. Pat. No. 4,090,241, issued May 16, 1978 to R. L. Houston. Houston uses an unmodified line scan camera to measure stream diameters of a molten glass stream at a plurality of locations. After the stream diameters are measured, a mass flow rate, proportional to the square of the measured widths is calculated.

It is unlikely that such a system would produce repeatible results due to several problems. These problems are: (1) fluctuations in brightness of the molten stream due to temperature variations across the width of the stream and with time; (2) edge effects surrounding the molten stream; (3) limitations in focusing the lens; (4) fringing effects within the camera itself and (5) smoke and other spurious images.

An additional problem in previous usage of an unmodified line scan camera which magnifies the problems, noted above, is that photodiodes within the camera, used to measure width, are usually "saturated", i.e., the diodes have been used near the upper limit where the output of a diode ceases to respond linearly to increases in the brightness or light intensity of the light sensed. This resulted from the recommended practice of insuring that sufficient light from the molten stream enters the camera and because the problems outlined above were not recognized.

Unfortunately, the cumulative effect of these problem phenomena precludes an accurate and repeatible determination of the fluid stream width. Inasmuch as a width is usually measured in a line scan camera by counting the number of diodes which register a predetermined voltage, it is essential that the correct number of diodes are counted. The usage of present unmodified cameras, without taking into account the problems alluded to above, insures that too many photodiodes register this voltage.

Consequently, the system disclosed by Houston is incapable of correctly ascertaining the mass flow rate of a stream of molten material. Additionally, the system of Houston does not measure the temperature of the molten stream emanating from the furnace.

BRIEF SUMMARY OF THE INVENTION

The present invention provides a method of estimating the temperature and mass flow rate of a free falling molten stream of material from an overhead furnace, in which a plurality of sensors are arranged in a predetermined array. The sensors are exposed to energy emanating from the molten stream and have an output proportional to energy sensed by the sensors. The output of the sensors is measured at timed intervals and compared with a first value. In response to the comparison, the time intervals are varied to ensure that the maximum output of any one sensor is measured at a magnitude which is substantially equal to the first value. A count indicative of the number of sensor outputs above a second value is obtained and the magnitude of the flow properties of the molten stream is generated using the count and the time interval.

The instant invention also provides an apparatus or a system for estimating the temperature and/or mass flow rate of the freely falling molten stream of material from an overhead furnace comprising a plurality of sensors arranged in a predetermined array wherein the sensors are exposed to the stream and have an output proportional to sensed energy emanating from the stream. A means for measuring the output of the sensors at timed intervals sends its output to a means for comparing the output of each sensor to a first value. The output of the comparison means is transmitted to a means for varying the time intervals in response to the output of the comparison means to insure that the maximum output of any one sensor is measured at a magnitude which is substantially equal to the first value. Means are provided for obtaining a count indicative of the number of sensor outputs above a second value. Means are also provided for calculating the magnitude of a flow property of the molten stream of material using the sensor count. Finally, means are provided for generating the magnitude of another flow property using the output of the varying means.

BRIEF DESCRIPTION OF THE DRAWINGS

FIGS. 3A, 3B, 3C and 3D illustrate the effect of temperature on the measured width of a molten fluid stream having a fixed width.

FIG. 6 is a schematic wiring diagram of the scan rate control circuitry of the present invention.

DETAILED DESCRIPTION OF THE INVENTION

A conventional line scan camera, such as a Reticon LC 600 U 1024 Line Scan Camera, sold by the Reticon Corporation, Sunnyvale, CA, uses a lens to focus energy or light from an energy or light emitting "target" or a light source onto a plurality of sensors or photodiodes which are arranged in a predetermined array. When exposed to the light emanating from the targeted light source, a photodiode will generate a voltage that is proportional to the intensity of the sensed light and to the length of time the diode is exposed to the light of the target, i.e., the exposure time. As the light intensity of the target and exposure time increases, the voltage produced by the diode increases.

Periodically (at a fixed time interval or scan rate) a scanning mechanism in the camera sequentially "reads" the voltage generated by each photodiode. The voltage from each diode may be further processed in a conventional manner and displayed either visually on a cathode ray tube (CRT) or printed. The voltage output of each diode may be used to obtain an indication of the width of the light source, as in Houston, referenced above. However, the results of the use of a conventional unmodified line scan camera to determine the mass flow rate of a free falling molten stream of material have not been satisfactory to date as was alluded to above and as will be explained presently in greater detail.

Figure 1:
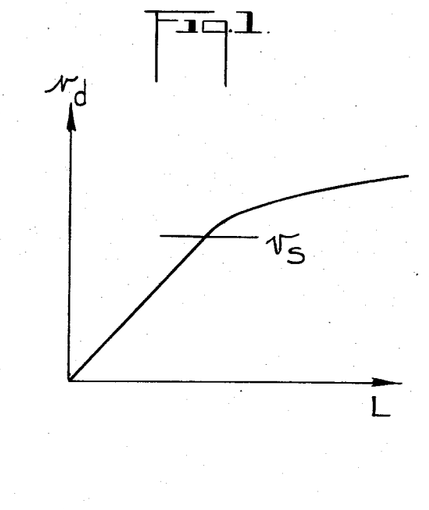
FIG. 1 demonstrates the output of a photodiode plotted against sensed light intensity of a light source.
Figure 1A:
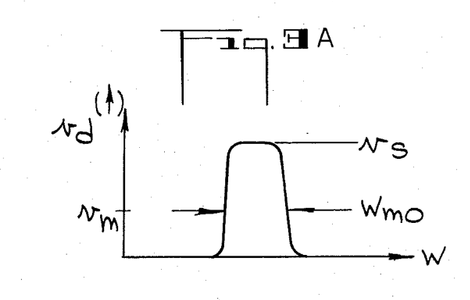
Figure 1B:
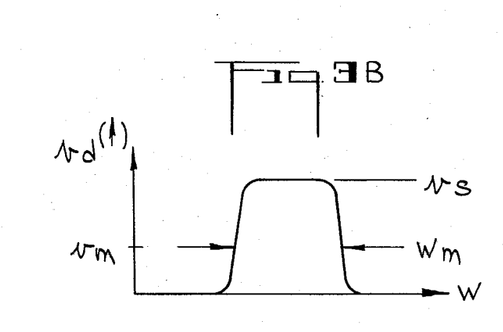
Figure 1C:
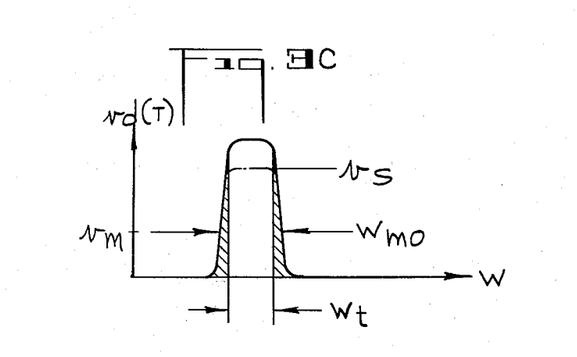
Figure 1D:
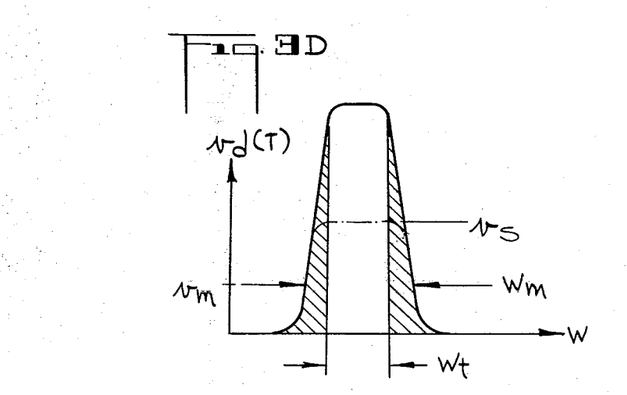

FIG. 1 illustrates the relationship between the voltage generated by a photodiode ($v_d$) and the intensity (L) of light from a target or a light source. As can be seen, there is a linear relationship between $v_d$ and L up to a certain voltage ($v_s$) which is defined as the "saturation voltage". When a photodiode approaches saturation, the output generated by the photodiode tends to respond non-linearly relative to an increase in L. Typically, the photodiodes in a conventional line scan camera are saturated in order to insure that enough light can be sensed by the photodiodes. As will be seen, the fact that the photodiodes are saturated amplifies certain problems associated with measuring the width and thus the mass flow rate of a moving mass of material such as a free falling molten stream of material.

As was alluded to above, the existance of several phenomena prevent an unmodified conventional line scan camera, operating near the saturation point of the photodiodes within the camera, from accurately estimating the width of a light source or a free falling stream of molten material. These phenomena are: (1) fluctuations in brightness of the molten stream; (2) stream edge effects; (3) camera lens focusing limitations; (4) camera internal fringing effects and (5) smoke and other spurious images.

The stream of molten material, falling by means of gravity from an overhead source of the molten material, is incandescent. Hence, it emits energy in the form of light. The light image of the stream comprises visible and infrared light which is not uniform across the width of the molten stream. Additionally, the temperature and thus the light intensity of the molten stream varies with time as the operating conditions of the source changes. Even though the temperature of the molten material may change, the width of the stream may not change. The non-uniform temperature and light intensity distribution across the width of a molten stream occurs because the exterior of the stream is more rapidly cooled by the ambient environment than the stream interior. Hence, the center of the stream appears to be hotter than the stream exterior. In conjunction with this, light emanating radially from the molten stream causes the image of the light intensity of the stream to appear rounded thereby decreasing the apparent width of the stream and altering the stream image to such an extent that the boundaries of the molten stream image do not appear vertical.

The image of the molten stream is further degraded by focusing limitations of the lens of most cameras. While line scan cameras are sensitive to both the visible and infrared light emanating from the target light source, i.e., the molten stream of material, a normal lens does not focus both of these light wave lengths in the same manner. Therefore, the lens of the camera causes either the infrared or the visible light to be out of focus on the photodiodes resulting in a further degradation of the sensed image. Most common lens filters are ineffective since they become transparent at infrared wave lengths. A filter that may protect the camera from infrared light still does not provide information necessary to determine whether the image of the stream appears rounded because of edge effects or limitations in the lens of the camera.

Fringing effects within a line scan camera also degrade the image of the light source to be measured. Oncoming light entering a line scan camera is reflected not only by the photodiodes measuring the light intensity of the light source or molten stream but by other structure present within the camera. With this scattering of light or fringing, an inaccurate light intensity reading may be recorded by a photodiode.

Vapors or smoke produced by the molten stream of material tend to diffuse light emanating from the molten material. While smoke is more of a problem with molten glass materials as compared to other materials such as molten refractory materials, it is still a source of image degradation which must be recognized and accounted for in the measurement process. Finally, other spurious images such as random reflections and ambient lights also contribute in a minor way to the degradation of the measured image of the molten stream.

All of these phenomena are effected to a greater or lesser degree by the temperature of the molten stream of material. Thus the net effect is that when the stream temperature varies the number of photodiodes activated increases beyond the true number of photodiodes that should be activated. Therefore, the camera cannot and does not measure the true width of a molten stream of material. During recent tests twice the number of photodiodes in an unmodified line scan camera were activated compared to the number of photodiodes activated by a line scan camera modified in accordance with the principles of the present invention.

Figure 2:
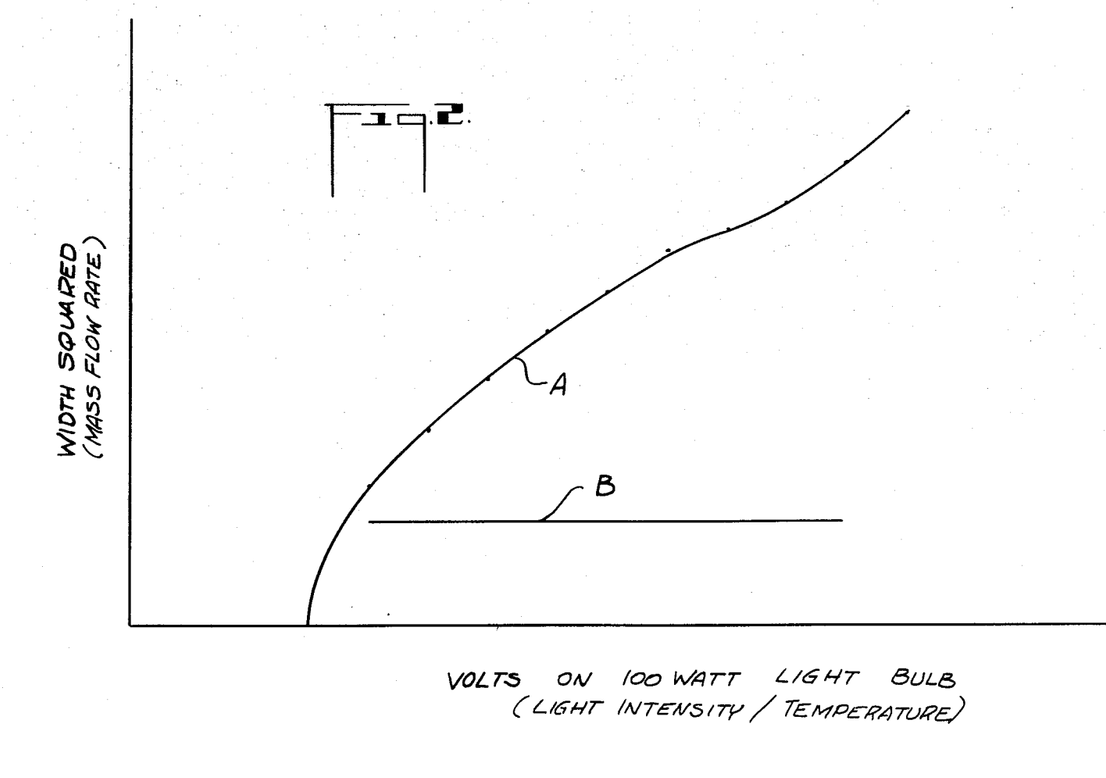
FIG. 2 shows the effect of light intensity on the measured width of a light source.

An experiment was conducted to confirm the theory that the temperature of the stream affects the degradation of a measurement of the stream width by a line scan camera and thus its ability to measure that width. FIG. 2 illustrates the results of this experiment. In the experiment, a 100-watt light bulb was used as a light source representing the molten stream. Since in practice the molten stream will vary in temperature and thus in light intensity, the light intensity of the bulb was varied by increasing the voltage on the light bulb. The "width" of the light bulb was defined by separating two steel plates by an arbitrary but fixed distance. The light bulb was disposed on one side of the plates behind the defined separation and an unmodified line scan camera was disposed on the other side of the plates and focused on the light bulb. As curve A of FIG. 2 shows, when the voltage on the light bulb increased and thus its light intensity, the measured width ("width squared") increased for an unmodified line scan camera having a fixed scan rate despite the fact that the actual image width of the light bulb was fixed by the steel plates. Curve B in FIG. 2 illustrates the measured width of a light bulb using a modified line scan camera as in the present invention. The correct width of the light bulb as shown in curve B can be measured by a presently modified line scan camera despite great changes in light intensity (temperature) of the light source (molten stream).

Saturating the photodiodes of an unmodified line scan camera can conceal the effects temperature has on the measurement of the width of a molten stream using the line scan camera. FIGS. 3A, 3B, 3C and 3D illustrate this problem. These Figures show diode voltage readings versus a length; in these cases stream width for a low temperature stream (FIGS. 3A and 3C) and a high temperature stream (FIGS. 3B and 3D). In all instances, it is presumed that the stream is round and is of a constant diameter and that the width of the stream is measured at a constant voltage, i.e., $v_m$. The voltage $v_m$ was chosen in practice as approximately ½ the saturation voltage because it allowed a good area of resolution. FIGS. 3A and 3B represent the data obtainable from a conventional line scan camera where the diodes are saturated at a fixed voltage limit, e.g., 5 volts. FIGS. 3C and 3D represent the data obtainable from a camera which has no voltage limitations on the diodes.

Comparing the figures, it can be seen that as temperature increases, the width measured increases (i.e., $w_{m0}$ to $w_m$) in contrast to what should be measured, i.e. the true width ($w_t$). The upper portion of the image is concealed in FIGS. 3A and 3B due to saturation of the diodes, while in FIGS. 3C and 3D the full extent of the problem may be ascertained.

In FIG. 3C the "true width", $w_t$, is hidden by the temperature effects of the molten stream which are represented by the shaded sections of the curve. As the molten stream temperature increases, as in FIG. 3D, these effects also increase as seen by the increased area of the shaded section of the curve. In fact, FIG. 3C and 3D graphically illustrate that the effects of temperature are magnified more greatly in a line scan camera having a fixed voltage level and operated at the saturation point of its diodes.

FIGS. 3A, 3B, 3C and 3D represent the temperature effects on a typical line scan camera having a fixed scan rate. The present invention proposes to scale the image of the stream to a fixed light intensity (i.e., "normalize" the stream image) and measure the width of the stream image at an arbitrary but fixed voltage level by varying the scan rate of the camera and thus the exposure time of the diodes. Usually the fixed voltage level or first value is about 80-90% of the saturation voltage of the selected line scan camera. While the width of a normalized stream image measured as in the present invention does not reflect a true width because of the problems mentioned earlier, the width is in error by a constant and can be accounted for by calibration of the present system.

The present invention may be construed as constituting an automatic gain control for a conventional line scan camera. The present invention should not, however, be understood as being restricted or limited for use with line scan cameras. The invention will work equally as well as an automatic gain control for any camera having a multitude of sensors arranged in a predetermined array or a matrix.

Figure 4:
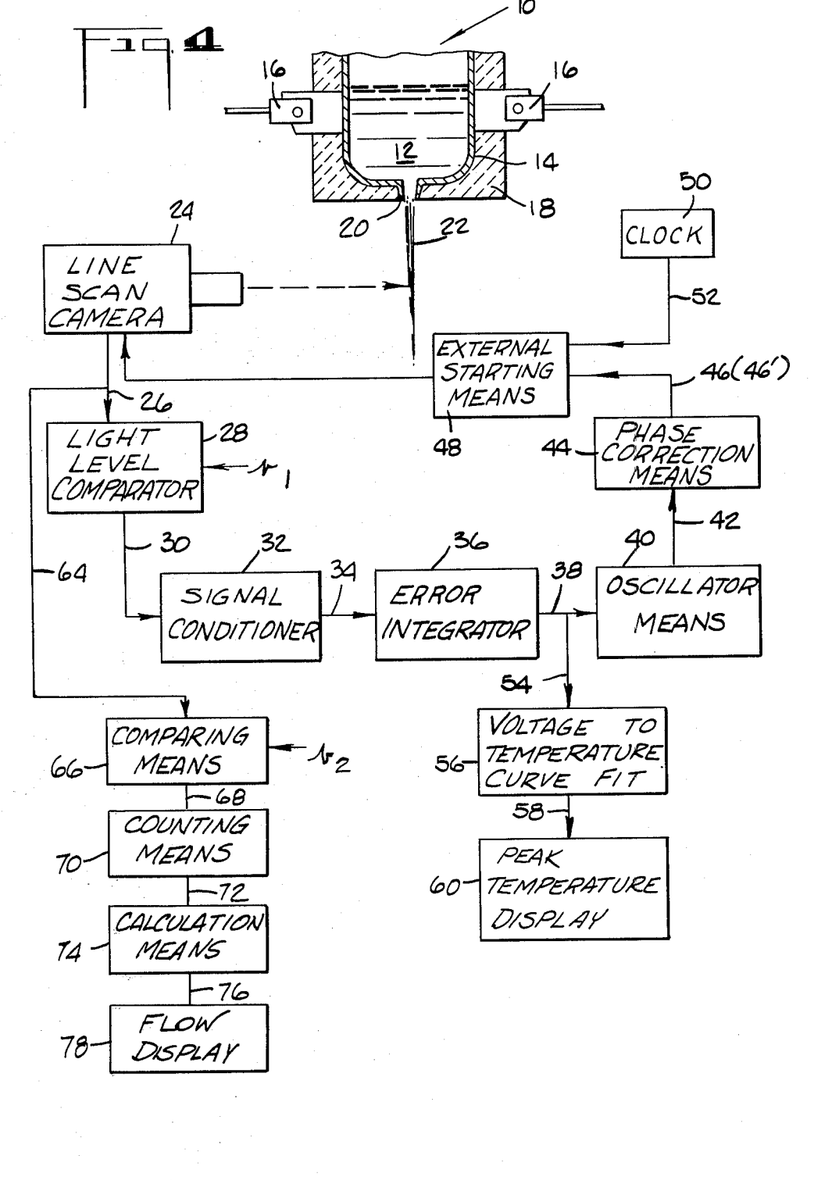
FIG. 4 is a block diagram of the present invention.

FIG. 4 generally illustrates the operation of the present invention with respect to an electric furnace. However, the present invention should be considered as being useful in determining the temperature and/or mass flow rate of any moving mass which is emanating from the source of that mass.

Although the source of the mass is shown in FIG. 4 as a furnace 10, the source could be any container, including, e.g., a bushing used to filamentize molten material. The furnace 10, which could be heated by gas or electricity, is shown, in the preferred embodiment, as an electric furnace and is used as a source of a mass of molten material 12. The furnace 10 which is of a conventional design, may have a metal lining 14 such as a platinum/rhodium alloy and may be heated by its own resistance by passing a current through a plurality of lugs 16 which are conductively connected to the lining 14. A thermal insulation layer 18 may surround the metal lining 14. Any material capable of being melted may be melted in the furnace 10 or the furnace 10 can be used to further heat or reheat the previously melted material.

Molten material fed out of the furnace through an outlet orifice 20, controllable by any conventional means, not shown, falls by gravity as a freely falling stream 22. It is usually desirable to control the temperature of the stream 22 by adjusting the amount of current fed to the lugs 16. Additionally, the mass flow rate or pour rate of the furnace 10 may be controlled by varying the temperature of the molten material 12 or by adjusting the outlet orifice 20. To accomplish this for a closed loop control system, it is necessary to continuously measure the temperature and/or mass flow rate of the stream 22.

This is accomplished in the present invention by fixedly positioning a conventional line scan camera 24 proximate the stream 22 so that at least some of the sensors or photodiodes (not shown) of the camera are exposed to the temperature or light intensity of the light emanating from the stream 22. The line scan camera 24 is positioned to take advantage of the most effective use of the photodiodes of the camera. After the scanning mechanism (not shown) of the camera has measured the voltages 26 produced on the photodiodes exposed to the light intensity of the stream 22, a light level comparator 28 found in conventional line scan cameras determines whether any of the diodes has produced an output voltage above an arbitrary but fixed voltage level or a first value, i.e., $v_1$. Usually the light level comparator of an unmodified line scan camera is used to check for an adequate amount of light for accurate readings. However, in the present invention, the light level comparator is used to compare the voltages of the photodiodes with the arbitrary but fixed voltage level. This level is selected to be above the noise contributed by the effects noted above, but below the voltage level at which the diodes are saturated. A stable voltage level has been found to be 80 to 90 percent of the saturation level of the photodiodes of a chosen line scan camera.

After the light level comparator 28 has compared the voltages read on the diodes by the scanning mechanism to the predetermined voltage level, $v_1$, its output 30 is further processed by a signal conditioner 32 which ensures that a suitable wave form output 34 is passed to an error integrator 36.

The error integrator 36 ramps the output voltage 34 up or down depending on the voltage 34 of the signal conditioner 32. The integrator 36 sends an increasing or decreasing voltage output 38 to a voltage control oscillator means 40. The oscillator means 40 sends a scan start pulse 42 to the camera, i.e., to the external scan starting means 48 of the camera, to cause the scanning mechanism of the camera to begin reading the voltages on the photodiodes. The pulse 42 is given a phase correction by a means 44 which has outputs 46 or 46' that are sent to the means 48. A clock 50, forming a part of the camera 24 feeds a series of voltage pulses 52 to the external scan starting means 48 to cause the photodiodes to be measured by the camera scanning mechanism when the means 48 receives a phase corrected signal 46 or 46'. If the line scan camera chosen does not have provisions for an external scan starting means or provisions for externally modifying the scan rate of the camera, then the camera chosen should be adapted to incorporate this feature.

The output voltage 38 of the error integrator 36 may be further processed by obtaining an output 54 and correlated by a means 56 to the temperature of the stream 22 being measured by the line scan camera 24. Optionally, a peak temperature display means 60 may use the output 58 of the temperature correlation means 56 to display the maximum temperature of the stream 22.

Figure 5:
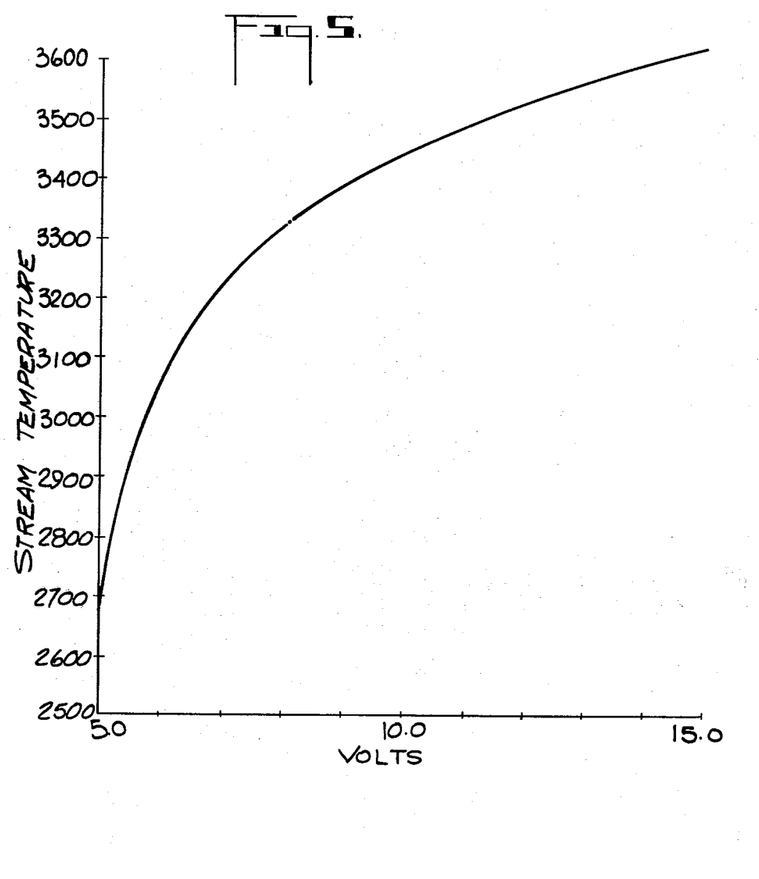
FIG. 5 shows a correlation of the scan control voltage versus stream temperature as measured by a conventional temperature sensor.

The temperature correlation means 56 may be a computer which correlates the voltage 54 to a known voltage-temperature curve such as the one shown in FIG. 5. The data reflected in FIG. 5 was obtained by correlating the voltage 54 (i.e., voltage 38) to the temperature recorded by a conventional temperature sensor, such as an optical pyrometer. Means 56 can also be a volt meter read by an operator who correlates the voltage reading to data comparable to that illustrated in FIG. 5. Additionally, the voltage 54 can be run to an analog meter calibrated in terms of temperature units. The calibration would be based on the type of data reflected in FIG. 5.

Mass flow rate measurements may be made by obtaining a signal 64 equivalent to the voltages 26 and transmitting it to a comparing means 66. The output of each diode is compared by means 66 to a second value, $v_2$, in order to insure that the output of each diode to be counted is above a certain value. The output of the comparing means 66, i.e., signal 68, is read by a counting means 70 which counts the number of diodes having an output above $v_2$. A mass flow rate calculation means 74 computes or generates the mass flow rate based on the number of diodes and sends a signal 76 to a display 78 which may visually display the mass flow rate or may print this information in hard form.

Referring now to FIG. 6, the scan control circuitry of the present invention is illustrated and comprises the signal conditioner 32, the error integrator 36, the voltage control oscillator 40 and the phase correction means 44.

As illustrated, the signal conditioner 32 comprises an invertor 80 which is connected in series to the output 30 of the light level comparator 28. The output 34 of the invertor 80 is connected to the error integrator 36 which comprises a plurality of resistors 84, 86 and 88, an operational amplifier 90, having an input 92, and a capacitor 94. The resistor 84 is connected in series with the operational amplifier 90 as is the resistor 86 and the resistor 88. The capacitor 94 is connected in parallel with the operational amplifier 78.

The voltage output 38 of the error integrator 36 is connected to the voltage control oscillator means 40 which comprises a resistor 96 connected in series with a voltage control oscillator 98, while a resistor 100 and a capacitor 102 is connected in parallel to the oscillator 98. The voltage output 42 of the oscillator means 40 is connected in series to the phase correction means 44.

The phase correction means 44 comprises a pair of series connected invertors 104 and 106 which are provided with the outputs 46, 46', respectively. The phase correction means 44 provides a synchronized starting pulse 46 or 46' which is fed to the external scan starting means 48 of the camera 24. The pulse 46 or the pulse 46' is necessary in order to have a differential signal which is useful for noise immunity.

In operation, when any photodiode exceeds the predetermined voltage level, $v_1$, e.g., 4 volts, as determined by the comparator 28, the output voltage 30 increases. This increased voltage causes the output voltage 34 to decrease to a low value, e.g., 0 volts. When the output voltage 34 is zero, a slight negative voltage will appear at the input 92 of the operational amplifier 90 created by resistor 88. The value of the resistors 84, 86, 88 and the capacitor 94 are chosen to cause the voltage output 38 of the amplifier 90 to increase at a certain rate per second (volts per second).

If the output voltage of all the photodiodes is below the predetermined value, $v_1$, as determined by the comparator 28, the comparator 28 generates a low output 30 which is transmitted to the invertor 80. In response to a low voltage at 30, the invertor 80 produces a relatively high voltage represented by the signal 34 forcing the input 92 to amplifier 90 to be positive. The resistors 84, 88 and the amplifier 90 force the output voltage 38 to go down at a certain voltage per second.

The output voltage 38 of the error integrator 36 is used to charge the capacitor 102 through the resistors 96 and 100 of the voltage control oscillator means 40. The higher the value of the output voltage 38, the more rapidly the capacitor 102 is charged. When the capacitor 102 reaches a preset voltage which is equivalent to a voltage internal to the oscillator 98, the capacitor 102 discharges its charge through the resistor 100 and causes the oscillator 98 to generate a voltage pulse at 42.

The pulse 42 is further processed by the invertors 104 and 106 to insure that the pulse 42 is transmitted to the camera 24 via 46 or 46' at the proper phase by the inverters 104 or 106.

The faster that the capacitor 102 is charged, the more rapidly the scan start voltage pulse 42 is generated by the oscillator 98. Therefore, as the voltage on the operational amplifier 90 increases due to the increased light emanating from the stream 22, the charging rate in the capacitor 102 also increases. The increased light or temperature of the stream consequently causes the scanning rate of the camera to increase, thereby "normalizing" the image of the stream 22.

For a normalized stream image, the scanning rate of the camera will be substantially constant. However, as the light intensity of a cooling molten stream decreases, the capacitor 102 will not be charged as rapidly by the error integrator 36, i.e., the output voltage 38 will be decreasing at a certain rate. As a result, the oscillator 98 will decrease the frequency of the scanning start pulse 42 and the scan rate of the camera 24 will decrease, thereby allowing the photodiodes of the camera to be exposed for a greater length of time to the intensity of the light emanating from the stream 22.

If there is insufficient light in the camera to activate the comparator 28, the output 38 of the amplifier 90 is slowly ramped down by the resistor 86. This decreasing output 38 is fed to the voltage control oscillator 98 via the capacitor 102 which concomitantly causes the frequency of the synchronized starting pulse 46 or 46' to be reduced. This reduction of the frequency of the scan rate allows a greater exposure time for the photodiodes of the camera. This process is continued until the exposure of the diodes is adequate to activate the comparator 28. When the comparator 28 is initially activated, the voltage output 38 of the amplifier 90 of the error integrator 36 is ramped up to increase the scanning frequency.

The process of raising and lowering the scanning frequency in relation to the temperature or light intensity variances of the stream 22 may occur at a relatively slow rate. This rate of change is controlled by the characteristics of the voltage control oscillator 98 and by a time constant which is a function of the values of the resistors 84, 86 and the capacitor 94. Consequently, the voltages on the diodes are oscillating slowly above and below the predetermined voltage level $v_1$ that is used by the comparator 28 at the standard against which the voltage on each diode is judged. However, this variation is relatively small and does not materially affect the accuracy of the camera system.

The average voltage 38 going to the oscillator 98 is adequate to normalize the light intensity of the image to the stream 22 and can be correlated, using the equivalent voltage 54, to the brightness of the stream 22. Since the brightness of the stream is a function of its temperature, the signal 54 can be correlated by the conventional means 56 to the temperature of the stream. In the preferred embodiment to the present invention, the voltage 54, which is equivalent to the voltage 38 which controls the scan rate of the line scan camera 24, may be transmitted to a conventional volt meter. The volt meter readings can then be correlated to a conventional method presently used to measure temperature, e.g., an optical pyrometer.

As FIG. 5 indicates, the voltage 54 (voltage on the voltage control oscillator 98) can be correlated to the measured temperature of a conventional stream temperature sensor. Optionally, a conventional calibrated analog meter may be used to display the peak temperature of the stream 22.

To determine the mass flow rate of a molten stream of material 22, the number of exposed diodes generating at least a minimum voltage, $v_2$, is compared using means 66. These diodes are counted using the conventional means 70 within the line scan camera. Assuming that the line scan camera has measured the width or diameter of a completely circular stream, the mass flow rate may be calculated using the expression:

$$M_f = A \times W^2 - B \tag{1}$$

where $M_f$ = mass flow rate
A = an experimental constant
B = an experimental constant
W = # of diodes counted or width of the stream A and B are constant if and only if the line scan camera is positioned so that it is exposed to a circular stream several furnace outlet orifice diameters downstream of the initial exit of the stream 22, i.e., from the orifice 20. The system is calibrated by determining A and B using the standard ladle method of estimating mass flow rates and conventional curve fitting techniques. Furthermore, the camera must be fixedly positioned and the image must be normalized as described above. If the camera 24 is moved whereby the camera sights or views a different portion of the stream 22, then the image of the stream must again be normalized, i.e., the light intensity measured by all exposed photodiodes must be limited to the predetermined voltage level mentioned above and a new set of constants must be derived.

Table 1, below, indicates the results of a comparison of the mass flow rate measurement from a line scan camera modified using the scan rate control of the present invention with the "actual flow" being measured by the ladle method. As can be seen, the average error was about 3 percent. Much of this error is probably related to timing the ladle under the stream. Typically the ladle was held under the stream for 5 to 15 seconds. Another source of error in the comparison is that a person's timing accuracy is only 0.2 seconds. Inaccurate weighing could also account for another error. In general, the camera system of the present invention can give a flow rate at least as accurately as the ladle method.

TABLE #1

| | FLOW MEASUREMENT | | |
|---|---|---|---|
| | Reticon | Actual Flow | % Error |
| 1 | 180 | 172 | −4.6 |
| 2 | 765 | 760 | −.6 |
| 3 | 760 | 774 | +1.8 |
| 4 | 1010 | 984 | −2.6 |
| 5 | 990 | 940 | −5.3 |
| 6 | 1000 | 1019 | +1.9 |
| 7 | 980 | 1012 | −3.2 |
| 8 | 295 | 305 | +3.2 |
| 9 | 295 | 289 | −2.0 |
| 10 | 280 | 291 | +3.7 |
| 11 | 630 | 645 | +2.3 |
| 12 | 625 | 604 | −3.4 |
| 13 | 860 | 822 | −4.6 |
| 14 | 840 | 799 | −5.1 |
| 15 | 830 | 803 | −3.3 |
| 16 | 325 | 298 | −9.0 |
| 17 | 890 | 887 | −0.3 |

TABLE #1-continued

| | FLOW MEASUREMENT | | |
|---|---|---|---|
| | Reticon | Actual Flow | % Error |
| 18 | 850 | 834 | −1.9 |
| 19 | 470 | 458 | −2.6 |
| 20 | 580 | 583 | +.5 |
| 21 | 920 | 912 | −.8 |
| 22 | 1080 | 1043 | −3.5 |
| 23 | 1080 | 1041 | −3.7 |
| 24 | 280 | 281 | +.3 |
| 25 | 330 | 332 | +.6 |
| 26 | 280 | 286 | +2.0 |
| 27 | 250 | 272 | +7.4 |
| 28 | 260 | 262 | +0.7 |
| 29 | 220 | 221 | +0.4 |
| 30 | 235 | 230 | −2.1 |
| 31 | 1405 | 1363 | −3.0 |
| 32 | 1370 | 1276 | −7.3 |
| 33 | 1475 | 1405 | −4.9 |
| 34 | 1415 | 1485 | +4.7 |
| 35 | 1355 | 1425 | +3.5 |
| 36 | 1365 | 1385 | +1.4 |
| 37 | 1410 | 1343 | −4.9 |

$\frac{E}{37} = -1\%$

Ave./E/ = 3.05%

The stream 22 of a conventional furnace 10 occasionally wanders out of the viewing range of the camera 24. This problem can be eliminated by selecting a line scan camera having a sufficient number of sensors or photodiodes. Also at times the stream 22 may be highly discontinuous caused by extremely high stream temperatures or a relatively low mass flow rate. When the stream is significantly discontinuous, a line scan camera modified according to the present invention will tend to indicate a mass flow rate that is lower than a mass flow rate measured by the ladle technique. Stream flow rates in excess of 400 pounds per hour have been found to be stable and may be satisfactorily measured by the present invention.

The temperature and mass flow measurements obtainable with the present invention are extremely useful. In one case the temperature and/or mass flow rate could be used to control the energy input to the furnace 10 through the lugs 16. Additionally, the mass flow rate may be useful for controlling the flow size of the adjustable orifice 20.

The present invention is also useful for determining the position of the stream 22. As the stream wanders, different photodiodes in the camera 24 are exposed to the light intensity of the stream 22. Using a convention technique, the position of the photodiodes can be correlated to the stream position. Knowing the true location of the stream 22 allows a user of the present invention to accurately position apparatus located downstream of the furnace 10. For example, a fiber attenuator (not shown) capable of fiberizing the material 12 and located downstream of the furnace 10 may be accurately positioned directly under the stream 22 allowing more uniform fiberization.

The present invention has been premised and the previous discussion has presumed that the cross section of the moving mass or molten stream 22 can be characterized as being circular. While in theory this is a fair approximation of what is really happening, a closer approximation of the actual molten stream configuration may be obtained by utilizing a plurality of line scan cameras modified as in the present invention. These cameras would be appropriately located around the stream 22 and calibrated, as above. The width measured by the cameras could then be multiplied together to determine the stream area which is related to mass flow rate.

Obviously, many modifications and variations of the presented invention are possible in light of the above teachings. It is therefore to be understood that within the scope of the appended claims the invention may be practiced otherwise than as specifically described.

What is claimed and desired to be secured by Letters Patents of the United States is:

1. A method for estimating flow properties of a moving mass, comprising:
   arranging a plurality of sensors in a predetermined array,
   exposing said sensors to energy emanating from said mass, each sensor having an output proportional to energy sensed by said sensors;
   measuring the output of said sensors at timed intervals,
   comparing the output of each sensor with a first value,
   varying said time intervals in response to said comparison to ensure that the maximum output of any one sensor is measured at a magnitude which is substantially equal to said first value,
   obtaining a count indicative of the number of sensor outputs above a second value, and
   generating the magnitude of said flow properties using said count and said intervals.

2. The method as in claim 1, wherein the measuring of said sensor outputs is performed sequentially.

3. The method as in claim 2, wherein the output of said sensors is measured successively.

4. The method as in claim 1, wherein the time interval between the initiation of each of said output measurements is varied.

5. The method as in claim 1, wherein the time interval between the measurement of each sensor is varied.

6. The method as in claim 4 or claim 5, wherein the time interval is increased if any sensor output is below said first value.

7. The method as in claim 4 or claim 5, wherein the time interval is decreased if any sensor output is above said first value.

8. An apparatus for determining flow characteristics of a moving fluid stream, comprising:
   a plurality of sensors arranged in a predetermined array, said sensors being exposed to said stream and having an output proportional to sensed energy emanating from said stream;
   means for measuring the output of said sensors at timed intervals,
   means for comparing the output of each sensor with a first value, said comparison means having an output,
   means for varying said time intervals in response to said comparison means output to ensure that the maximum output of any one sensor is measured at a magnitude which is substantially equal to said first value,
   means for obtaining a count indicative of the number of sensor outputs above a second value,
   means for calculating the magnitude of one of said flow properties using said count, and
   means for generating the magnitude of another of said flow properties using the output of said varying means.

9. An apparatus as in claim 8, comprising means for sequentially measuring the output of each sensor.

10. An apparatus as in claim 8, wherein said varying means comprises a signal conditioner, an error integrator, an oscillator means and a phase correction means.

11. An apparatus as in claim 10, wherein said signal conditioner comprises an inverter, said inverter having an input connected to said comparing means and an output connected to said error integrator.

12. An apparatus as in claim 11, wherein said error integrator comprises a first resistor connected to said inverter output, said first resistor being connected to said inverter output, said first resistor being connected to an operational amplifier, the inputs of said amplifier being connected to a second resistor and a third resistor, said amplifier having an output, one of said amplifier inputs and said amplifier output being connected to a first capacitor.

13. An apparatus as in claim 12, wherein said amplifier output is connected to said another flow property generation means.

14. An apparatus as in claim 13, wherein said another flow property generation means comprises a correlation means for relating the output of said amplifier to temperatures representative of the energy of said stream.

15. An apparatus as in claim 13, wherein said oscillator means is connected to said amplifier output.

16. An apparatus as in claim 15, wherein said oscillator means comprises a fourth resistor connected to said amplifier output, said fourth resistor being connected to a fifth resistor, said fifth resistor being connected to a voltage controlled oscillator, said oscillator being connected to a second capacitor, whereby when said amplifier output varies said second capacitor causes the output of said oscillator to vary.

17. An apparatus as in claim 16, wherein said oscillator output is connected to said phase correction means.

18. An apparatus as in claim 17, wherein said phase correction means comprises a plurality of phase correcting inverters, each of said correcting inverters having an output.

19. An apparatus as in claim 18, wherein said correcting inverter outputs are connected to said sensor output measuring means.

20. An apparatus as in claim 8, wherein said one flow property calculating means comprises means for comparing said sensor outputs with said second value, said second value comparing means being connected to said one flow property calculation means.

* * * * *